United States Patent
Chen et al.

(10) Patent No.: US 12,442,992 B2
(45) Date of Patent: *Oct. 14, 2025

(54) WAVELENGTH DIVISION MULTIPLEXER

(71) Applicant: ACACIA TECHNOLOGY, INC., San Jose, CA (US)

(72) Inventors: Long Chen, Marlboro, NJ (US); Christopher Doerr, Middletown, NJ (US); Li Chen, Marlboro, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/833,299

(22) Filed: Jun. 6, 2022

(65) Prior Publication Data
US 2022/0308296 A1    Sep. 29, 2022

Related U.S. Application Data

(60) Division of application No. 16/441,775, filed on Jun. 14, 2019, now Pat. No. 11,353,666, which is a (Continued)

(51) Int. Cl.
| G02B 6/293 | (2006.01) |
| G02B 6/12 | (2006.01) |
| G02B 6/42 | (2006.01) |

(52) U.S. Cl.
CPC ....... *G02B 6/4215* (2013.01); *G02B 6/12007* (2013.01); *G02B 6/29332* (2013.01); *G02B 6/2938* (2013.01); *G02B 2006/12097* (2013.01)

(58) Field of Classification Search
CPC ............ G02B 6/12007; G02B 6/29332; G02B 6/2938; G02B 6/4215; G02B 2006/12097
See application file for complete search history.

(56) References Cited

U.S. PATENT DOCUMENTS

| 5,170,451 A | 12/1992 | Ohshima |
| 8,064,741 B2 * | 11/2011 | Cherchi ................. G02B 6/305 |
| | | 385/28 |

(Continued)

FOREIGN PATENT DOCUMENTS

GB    2251957 A    7/1992

OTHER PUBLICATIONS

Kiyoshi, Kishioka et al. "A Novel Three-Wavelength Demultiplexer Utilizing The Two- and Three-Guide Couplers", Journal of Lightwave Technology, IEEE Service Center, New York, NY, US, vol. 11, No. 2, Feb. 1, 1993.

(Continued)

*Primary Examiner* — Ryan A Lepisto
(74) *Attorney, Agent, or Firm* — Patterson + Sheridan, LLP (57)    ABSTRACT

An integrated wavelength division multiplexer is described. The integrated wavelength division multiplexer may include a first waveguide core defining a first propagation axis and configured to guide light of a first wavelength and light of a second wavelength, and a second waveguide core defining a second propagation axis and configured to guide the light of the second wavelength. A first portion of the second propagation axis for which the first waveguide core and second waveguide core may be overlapping is oriented at a non-zero angle relative to the first propagation axis. The first waveguide core and second waveguide core may be configured relative to each other to adiabatically couple the light of the second wavelength between the first and second waveguide cores.

10 Claims, 6 Drawing Sheets

Related U.S. Application Data continuation of application No. PCT/US2017/067889, filed on Dec. 21, 2017.

(60) Provisional application No. 62/437,628, filed on Dec. 21, 2016.

(56) References Cited

U.S. PATENT DOCUMENTS

| | | | | |
|---|---|---|---|---|
| 8,238,704 B2* | 8/2012 | Ben Bakir | ............. | G02B 6/305 |
| | | | | 977/932 |
| 8,873,906 B2* | 10/2014 | Tokushima | ...... | B29D 11/00663 |
| | | | | 264/1.25 |
| 8,948,555 B1* | 2/2015 | Roth | ................. | G02B 6/12002 |
| | | | | 385/27 |
| 9,746,607 B2* | 8/2017 | Collins | ................. | G02B 6/1228 |
| 10,852,484 B2* | 12/2020 | Testa | .................. | G02B 6/12004 |
| 11,353,666 B2* | 6/2022 | Chen | .................... | G02B 6/2938 |
| 2003/0012493 A1* | 1/2003 | Lee | .......................... | G02B 6/30 |
| | | | | 385/28 |
| 2003/0081902 A1 | 5/2003 | Blauvelt et al. | | |
| 2008/0267564 A1* | 10/2008 | Han | .................. | G02B 6/12004 |
| | | | | 385/45 |
| 2018/0231714 A1* | 8/2018 | Collins | .................... | G02B 6/26 |

OTHER PUBLICATIONS

International Search Report and Written Opinion received in International Application No. PCT/US2017/067889, mailed Jun. 28, 2018.

* cited by examiner

WAVELENGTH DIVISION MULTIPLEXER

CROSS-REFERENCE TO RELATED APPLICATIONS

The present application is a Divisional application of U.S. patent application Ser. No. 16/441,775 filed Jun. 14, 2019 entitled "WAVELENGTH DIVISION MULTIPLEXER," which is a Continuation of International Application Number PCT/US2017/067889, filed Dec. 21, 2017 entitled "WAVELENGTH DIVISION MULTIPLEXER," which claims the benefit under 35 U.S.C. § 119(e) of U.S. Patent Application Ser. No. 62/437,628, filed Dec. 21, 2016 entitled "WAVELENGTH-DIVISION-MULTIPLEXER COUPLER," which are hereby incorporated herein by reference in their entirety.

BACKGROUND

Field

The present application relates to wavelength division multiplexers (WDMs).

Related Art

In telecommunications, the amount of information that can be sent over a single optical fiber can be increased by sending information using multiple optical signals, each with a different wavelength. A WDM can be used at a transmitting end of the optical fiber to combine light from a group of optical fibers into the single optical fiber. On the receiving end of the optical fiber, another WDM can be used to demultiplex the multiple optical signals into another group of optical fibers.

WDMs may also be used to couple pump light and signal light for optical amplification.

BRIEF SUMMARY

According to one aspect of the present application, an integrated wavelength division multiplexer is provided. The integrated wavelength division multiplexer may include a first waveguide core defining a first propagation axis and configured to guide light of a first wavelength and light of a second wavelength; and a second waveguide core defining a second propagation axis and configured to guide the light of the second wavelength, wherein a first portion of the second propagation axis for which the first waveguide core and second waveguide core are overlapping is oriented at a non-zero angle relative to the first propagation axis. The first waveguide core and second waveguide core are configured relative to each other to adiabatically couple the light of the second wavelength between the first and second waveguide cores.

According to another aspect of the present application, an integrated optical device is provided. The integrated optical device may include a silicon photonics wavelength division multiplexer comprising first, second, and third waveguide cores configured to adiabatically couple light between the first waveguide core and the third waveguide core and adiabatically couple light between the second waveguide core and the third waveguide core; a first light source optically coupled to the first waveguide core; a second light source optically coupled to the second waveguide core; and a facet coupler configured to couple light emitted from the first light source and light emitted from the second light source to an optical fiber.

According to another aspect of the present application, an integrated wavelength division multiplexer is provided. The integrated wavelength division multiplexer may include a substrate; and means for multiplexing light of a first wavelength and light of a second wavelength. In some embodiments, the means for multiplexing light of a first wavelength and light of a second wavelength comprises means for physically separating the light of a first wavelength and the light of the second wavelength. In some embodiments, the means for physically separating may include first guiding means for guiding the light of the first wavelength and the light of the second wavelength; and a second guiding means for guiding the light of the second wavelength. In some embodiments the first guiding means and the second guiding means adiabatically couple the light of the second wavelength between the first guiding means and the second guiding means.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Aspects of the present application provide a wavelength division multiplexer (WDM) formed as a photonic integrated circuit (PIC). In at least some embodiments, the WDM uses adiabatic mode evolution to multiplex and/or demultiplex multiple optical signals. In some embodiments, multiplexing may include coupling light of a first wavelength from a first waveguide and light of a second wavelength from a second waveguide to a third waveguide, such that the third waveguide guides both the light of the first wavelength and the light of the second wavelength. In some embodiments, multiplexing may include coupling light of a second wavelength from the first waveguide into the third waveguide at a point where the third waveguide is already guiding the light of the first wavelength, removing the need for the second waveguide. Demultiplexing may include, for example, coupling light of a first wavelength from a first waveguide to a second waveguide and either coupling light of a second wavelength from the same first waveguide to a third waveguide or maintaining the light of the second wavelength in the first waveguide. In some embodiments, the multiplexing and demultiplexing is accomplished using a WDM where a transverse optical mode of the light of the first wavelength overlaps with a transverse optical mode of the light of the second wavelength at a first end of the WDM and the transverse optical mode of the light of the first wavelength does not substantially overlap with a transverse optical mode of the light of the second wavelength at a second end of the WDM.

In some embodiments, the WDM does not use interference to accomplish multiplexing and/or demultiplexing. The WDM, according to such embodiments, may be more tolerant to fabrication variations than interferometeric WDMs. In some embodiments, WDMs that do not utilize interferometers are not limited to particular waveguide designs and materials, as is the case with interferometric WDMs. For example, to counteract environmental changes in the path lengths due to, e.g., temperature variations, interferometeric WDMs require an active tuning element to maintain a set phase difference between the two paths of the interferometer. In some embodiments, WDMs that do not use interferometers do not require an active tuning element. In some embodiments, the WDM based on adiabatic mode coupling is very low loss, broadband, and insensitive to fabrication variations. In some embodiments, WDMs based on adiabatic coupling of optical modes are smaller than interferometeric WDMs.

In some embodiments, a WDM includes a first waveguide core and a second waveguide core that are configured relative to each other to adiabatically couple light of a particular wavelength between the two waveguide cores. In some embodiments, the cross-section of the first waveguide core is larger than the cross-section of the second waveguide core. In some embodiments, the second waveguide core is partially embedded within the first waveguide core. In some embodiments, the second waveguide core crosses from one side of the first waveguide core to a second side of the waveguide core. In some embodiments, a propagation axis of the second waveguide core is oriented at a non-zero angle relative to a propagation axis of the first waveguide core. In some embodiments, a size of the cross-section of the second waveguide core changes from a first end of the WDM to a second end of the WDM. In some embodiments, a size of the cross-section of the first waveguide core changes from the first end of the WDM to the second end of the WDM. In some embodiments, the size of the cross-section of the first waveguide core increases as the size of the cross-section of the second waveguide core increases.

In some embodiments, an integrated optical device includes a WDM and other optical components. In some embodiments, a transmitting integrated optical device includes a first light source coupled to a first waveguide core and a second light source coupled to a second waveguide core. In some embodiments, the first and second waveguide cores are configured to adiabatically couple light to a third waveguide core. In some embodiments, a facet coupler is configured to couple light from the two light sources to an optical fiber. In some embodiments, the facet coupler includes an end of the third waveguide core.

In some embodiments, a receiving integrated optical device includes a facet coupler configured to receive light of a first wavelength and light of a second wavelength from an optical fiber or other off-chip optical component. In some embodiments, a first and a second waveguide core are configured to adiabatically couple light from a third waveguide core. In some embodiments, the light of the first wavelength is coupled to the first waveguide core and the light of the second wavelength is coupled to the second waveguide core. In some embodiments, the facet coupler includes an end of a third waveguide core. In some embodiments, the first waveguide core and the second waveguide core may couple light to respective photodetectors. In some embodiments, only one of the first or second waveguide cores may couple light to a photodetector and light from the other waveguide may be discarded, e.g., using a beam block.

The aspects and embodiments described above, as well as additional aspects and embodiments, are described further below. These aspects and/or embodiments may be used individually, all together, or in any combination of two or more, as the application is not limited in this respect.

Figure 1:
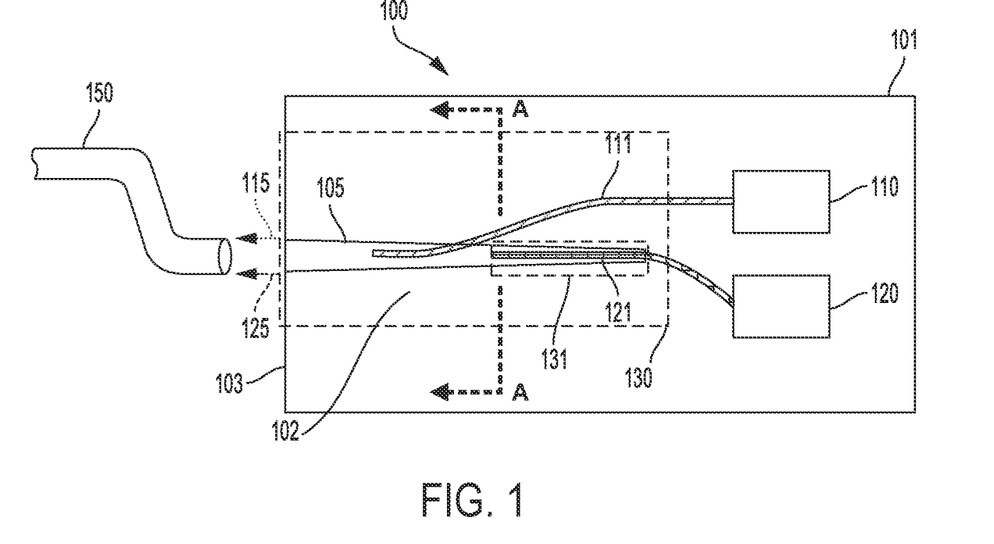
FIG. 1 is a top view of a transmitting optical system including a wavelength division multiplexer, according to a non-limiting embodiment of the present application.

FIG. 1 illustrates a transmitting optical system 100 according to a non-limiting embodiment. The transmitting optical system 100 includes a transmitting integrated optical device 101 and an optical fiber 150 configured to couple light 115 and 125 from the transmitting integrated optical device 101 to the optical fiber 150. The transmitting integrated optical device 101 includes a first light source 110, a second light source 120, a first waveguide core 111, a second waveguide core 121, and a third waveguide core 105 embedded in and/or on a cladding material 102. The cladding material 102 acts as a waveguide cladding for at least certain portions of the first waveguide core 111, the second waveguide core 121, and the third waveguide core 105. In some embodiments, the cladding material 102 comprises a material with an index of refraction that is less than the index of the refraction of the material used to form the first waveguide core 111, the second waveguide core 121, and the third waveguide core 105. For example, the cladding material 102 may include a silicon oxide, the first waveguide core 111 may be formed from silicon nitride, the third waveguide core 105 may be formed from a silicon oxide with an index of refraction greater than the index refraction of the cladding material, and the second waveguide 121 core may be formed from silicon. In some embodiments, the components of the transmitting integrated optical device 101 are microfabricated silicon photonics. Thus, the transmitting integrated optical device 101 may be a photonic integrated circuit (PIC) in at least some embodiments. In some embodiments, the components of the transmitting integrated optical device 101 are monolithically integrated into and/or onto a substrate. In some embodiments, the transmitting integrated optical device 101 is a semiconductor chip.

Referring back to FIG. 1, the first light source 110 and the second light source 120 may be semiconductor lasers that are formed on and/or in a substrate. In some embodiments, the first light source 110 emits light of a first wavelength into the first waveguide core 111 and the second light source 120 emits light of a second wavelength into the second waveguide core 121. In some embodiments, the first wavelength is different from the second wavelength. For example, the first wavelength may be 1550 nm and the second wavelength may be 980 nm or 1480 nm. In some embodiments, the first light may be signal light for use in an optical amplifier, e.g., an erbium-doped fiber amplifier, and the second light may be pump light for use in the optical amplifier. While FIG. 1 illustrates the first light source 110 and the second light source 120 as part of the transmitting integrated optical device 101, other embodiments may include off-chip light sources, such as solid-state lasers or fiber lasers, that are coupled to the transmitting integrated optical device 101 via, e.g., optical fibers.

Referring back to FIG. 1, a first end of the first waveguide core 111, ending at the first light source 110, is located at a different transverse position than a first end of the second waveguide core 121, ending at the second light source 121. In FIG. 1, a transverse axis defining the transverse position is vertical and perpendicular to a propagation axis of the third waveguide core 105, and a longitudinal axis defining a longitudinal position is horizontal and parallel to the propagation axis of the third waveguide core 105. A second end of the first waveguide core 111 and a second end of the second waveguide core 121 are located at different longitudinal positions, but are located at approximately the same transverse position near the center of the third waveguide core 105. Light from the first light source 110 is adiabatically coupled, via the first waveguide core 111, to the third waveguide core 105, and light from the second light source 120 is adiabatically coupled via the second waveguide core 121 to the third waveguide core 105. The portion of the transmitting integrated optical device 101 that includes the particular arrangement of the three waveguides 105, 111, and 121 is considered a WDM 130. In some embodiments, the second end of the first waveguide core 111 and the second end of the second waveguide core 121 may be located at some other transverse position relative to the center of the third waveguide core 105. In some embodiments, the first waveguide core 111, the second waveguide core 121, and the third waveguide core 105 may be arranged differently to form a WDM 130 that is different from that shown in FIG. 1.

Referring back to FIG. 1, the third waveguide core 105 terminates at a facet 103 of the transmitting integrated optical device 101. A facet coupler is formed by the end of the third waveguide core 105 terminating at the facet 103, and light 115 from the first light source 110 and light 125 from the second light source 120 is emitted from the facet coupler. The facet coupler of the transmitting integrated optical device 101 is configured to emit the light 115 and the light 125 into the optical fiber 150. The optical fiber 150 has a cross-sectional area that is approximately equal to the cross-sectional area of the third waveguide 105. The cross-sectional areas of the first waveguide core 111 and the second waveguide core 121 are smaller than the cross-sectional area of the optical fiber 150 and the cross-sectional area of the third waveguide core 105. In some embodiments, the third waveguide 105 serves as a facet coupler. In some embodiments, the third waveguide 105 is a spot size converter that adjusts the optical mode size from a smaller optical mode size of the first waveguide core 111 to a larger optical mode size of the optical fiber 150, or vice versa. The optical fiber 150 in FIG. 1 is placed apart from the transmitting integrated optical device 101, such that there is a gap between the end of the third waveguide core 105 and the optical fiber 150. In some embodiments, the optical fiber 150 may be placed in physical contact with the end of the third waveguide core 105.

Referring back to FIG. 1, the transmitting optical system 100 is configured to be used to multiplex light 115 from the first light source 110 and light 125 from the second light source 120 into a single optical fiber 150. In other embodiments, the light 115 and the light 125 may be kept with an integrated photonics device rather than coupled to an external device via the optical fiber 150.

Figure 2:
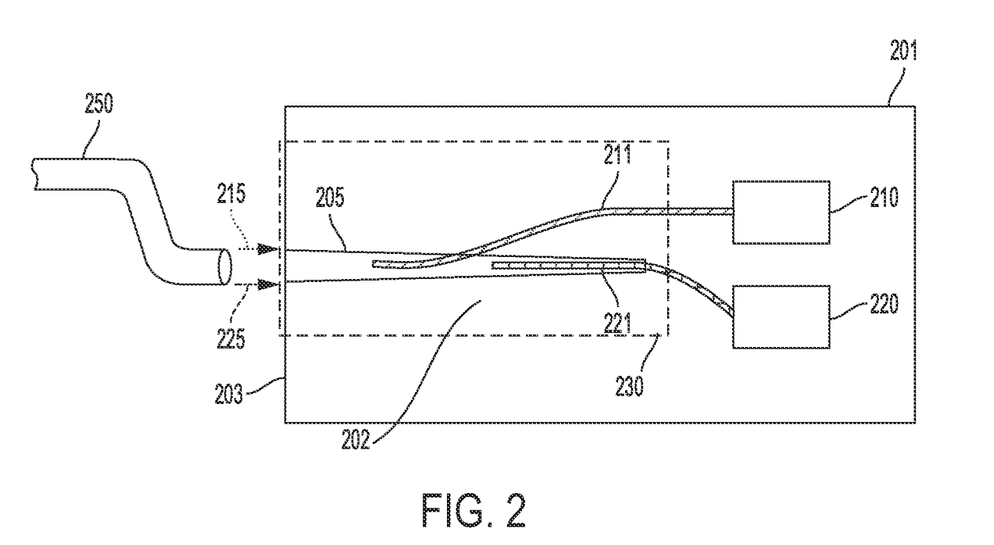
FIG. 2 is a top view of a receiving optical system including a wavelength division multiplexer, according to a non-limiting embodiment of the present application.

FIG. 2 illustrates a receiving optical system 200 according to a non-limiting embodiment. The receiving optical system 200 includes a receiving integrated optical device 201 and an optical fiber 250 configured to couple light 215 and light 225 from the optical fiber 250 to the receiving integrated optical device 201. The receiving integrated optical device 201 includes a first receiving circuit 210, a second receiving circuit 220, a first waveguide core 211, a second waveguide core 221, and a third waveguide core 205 embedded in and/or on a cladding material 202. The cladding material 202 acts as a waveguide cladding for at least certain portions of the first waveguide core 211, the second waveguide core 221, and the third waveguide core 205. In some embodiments, the cladding material 202 comprises a material with an index of refraction that is less than the index of the refraction of the material used to form the first waveguide core 211, the second waveguide core 221, and the third waveguide core 205. For example, the cladding material 202 may include a silicon oxide, the first waveguide core 211 may be formed from silicon nitride, the third waveguide core 205 may be formed from a silicon oxide with an index of refraction greater than the index refraction of the cladding material, and the second waveguide 221 core may be formed from silicon. In some embodiments, the components of the receiving integrated optical device 201 are microfabricated silicon photonics. In some embodiments, the components of the receiving integrated optical device 201 are monolithically integrated into and/or onto a substrate. In some embodiments, the receiving integrated optical device 201 is a semiconductor chip.

Referring back to FIG. 2, in some embodiments the first receiving circuit 210 and the second receiving circuit 220 include semiconductor photodetectors that are formed on and/or in a substrate. In some embodiments, the first receiving circuit 210 and/or the second receiving circuit 220 includes multiple components for complex functionalities. For example, the first receiving circuit 210 and/or the second receiving circuit 220 may include a circuit configured to detect an amplitude and a phase of received optical signals of one or more polarizations. In some embodiments, the first receiving circuit 210 detects light of a first wavelength received via the first waveguide core 211 and the second receiving circuit 220 detects light of a second wavelength received via the second waveguide core 221. In some embodiments, the first wavelength is different from the second wavelength. For example, the first wavelength may be 980 nm or 1480 nm and the second wavelength may be 1550 nm. While FIG. 1 illustrates the first receiving circuit 210 and the second receiving circuit 220 as part of the receiving integrated optical device 201, other embodiments may include off-chip optical receiving circuits that are coupled to the receiving integrated optical device 201 via, e.g., optical fibers. Additionally, while FIG. 1 illustrates two photodetectors, in other embodiments, one of the first receiving circuit 210 or the second receiving circuit 220 may be omitted and, optionally, replaced with a device that discard the light from the respective waveguide core. For example, in embodiments where the first light guided by the first waveguide core 211 is residual pump light from an optical amplifier, e.g., an erbium-doped fiber amplifier, and the second light guided by the second waveguide core 221 is signal light from the optical amplifier, only the signal light may be detected and the residual pump light may be discarded.

Referring back to FIG. 2, a first end of the first waveguide core 211, ending at the first receiving circuit 210, is located at a different transverse position than a first end of the second waveguide core 221, ending at the second photodetector 221. In FIG. 2, a transverse axis defining the transverse position is vertical and perpendicular to a propagation axis of the third waveguide core 205, and a longitudinal axis defining a longitudinal position is horizontal and parallel to the propagation axis of the third waveguide core 205. A second end of the first waveguide core 211 and a second end of the second waveguide core 221 are located at different longitudinal positions, but are located at approximately the same transverse position near the center of the third waveguide core 205. Light 215 received from the optical fiber 250 is adiabatically coupled to the first waveguide core 211 via the third waveguide core 205, and light 225 is adiabatically coupled to the second waveguide core 1221 via the third waveguide core 205. The portion of the receiving integrated optical device 201 that includes the particular arrangement of the three waveguides 205, 211, and 221 is considered a WDM 230. In some embodiments, the second end of the first waveguide core 211 and the second end of the second waveguide core 221 may be located at some other transverse position relative to the center of the third waveguide core 205. In some embodiments, the first waveguide core 211, the second waveguide core 221, and the third waveguide core 205 may be arranged differently to form a WDM 230 that is different from that shown in FIG. 2.

Referring back to FIG. 2, the third waveguide core 205 terminates at a face 203 of the receiving integrated optical device 201. A facet coupler is formed by the end of the third waveguide core 205 terminating at the face 203, and light 215 and light 225 are coupled into facet coupler. The facet coupler of the receiving integrated optical device 201 is configured to receive the light 215 and the light 225 from the optical fiber 250. The optical fiber 250 has a cross-sectional area that is approximately equal to the cross-sectional area of the third waveguide 205. The cross-sectional areas of the first waveguide core 211 and the second waveguide core 221 are smaller than the cross-sectional area of the optical fiber 250 and the cross-sectional area of the third waveguide core 205. The optical fiber 250 in FIG. 2 is placed apart from the receiving integrated optical device 201, such that there is an air gap between the end of the third waveguide core 205 and the optical fiber 250. In some embodiments, the optical fiber 250 may be placed in physical contact with the end of the third waveguide core 205.

Referring back to FIG. 2, the receiving optical system 200 is configured to be used to demultiplex light 215 and light 225 from the optical fiber 250 into the first waveguide core 211 and the second waveguide core 221, respectively. In other embodiments, the light 115 and the light 125 may be received from some other component within an integrated photonics device rather than received from an external device via the optical fiber 250.

FIG. 1 illustrates a transmitting integrated optical device 101 and FIG. 2 illustrates a receiving integrated optical device 201, but in some embodiments, the same structure may be used for both transmitting and receiving. For example, instead of the integrated optical device 201 including the first receiving circuit 210 and the second receiving circuit 220, the first receiving circuit 210 could be replaces with a light source such that a single integrated optical device includes a light source and a photodetector. Furthermore, in some embodiments, the same structure may be used as a pass-through device. For example, instead of the integrated optical device 201 including the first receiving circuit 210 and the second receiving circuit 220, the first receiving circuit 210 and the second receiving circuit 220 could be replaces with optical devices that perform a transmissive function and then route light to another optical fiber.

Figure 3:
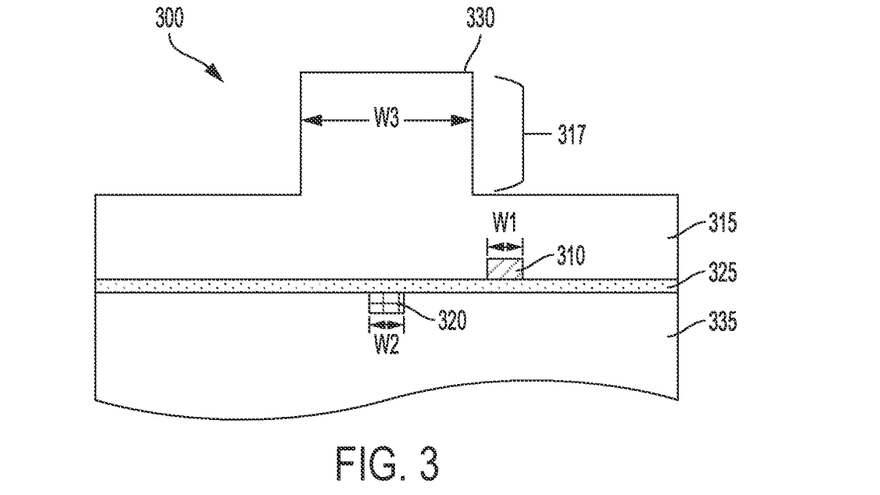
FIG. 3 is a cross-section view of a wavelength division multiplexer, according to a non-limiting embodiment of the present application.

FIG. 3 illustrates a cross-section view of a WDM 300 according to a non-limiting embodiment. FIG. 3 may be, for example, a cross-section view of the WDM 130 of FIG. 1 through the plane A-A illustrated in FIG. 1, but the WDM 300 is not limited to being the WDM 130 in the transmitting optical system 100, as shown in FIG. 1. The WDM 300 includes a first waveguide core 310, a second waveguide core 320 and a third waveguide core 330. In some embodiments, a cladding material is surrounds the upper side of the third waveguide core 330 to form a third waveguide. In the non-limiting embodiment of FIG. 3, the third waveguide is a rib waveguide that includes a raised rib portion 317 and a slab portion 315. The third waveguide core 310 extends vertically from a top surface of the rib portion 317 to the top surface of an insulator layer 325. The insulator layer may be, for example, a silicon oxide layer.

The first waveguide core 310 has a propagation axis that is oriented at a non-zero angle relative to a propagation axis of the third waveguide core 330, where the propagation axis of a particular waveguide core is the direction light is guided by the waveguide core. The propagation axis of a waveguide core may change based on the longitudinal position within the WDM 300. Thus, in some embodiments, different cross-section views of the WDM 300 would show the transverse position of the first waveguide core 310 at different locations depending on the cross-sectional plane used to form the cross-section view.

The first waveguide core 310 has a smaller cross-sectional area than the third waveguide core 330. For example, the width W3 of the third waveguide core 330 may be, for example, between 5 μm and 10 μm and the width W1 of the first waveguide core 310 may be, for example, between 200 and 500 nm. In some embodiments, the width W3 changes along a propagation axis of the first waveguide core 310. In some embodiments, the width W3 nearer to the facet coupler is greater than the width W3 farther from the facet coupler. For example, the width W3 at the facet coupler may be 10 μm and the width W3 at an end opposite the facet coupler of the third waveguide core 330 may be 5 μm. In some embodiments, the width W1 changes along a propagation axis of the first waveguide core 310. In some embodiments, the width W1 nearer to the facet coupler is less than the width W1 farther from the facet coupler. For example, the width W1 at the facet coupler may be 200 nm and the width W1 at an end opposite the facet coupler of the third waveguide core 330 may be 500 nm.

In some embodiments, the first waveguide core 310 is configured to guide light of a first wavelength (e.g., 980 nm), but not guide light of a second wavelength (e.g., 1550 nm). The third waveguide core 330 is configured to guide light of both the first wavelength and the second wavelength. The second waveguide core 320 is configured to guide light of the second wavelength.

The second waveguide core 320 is positioned at a layer of the WDM 300 that is below the first waveguide core 310 and the third waveguide core 330. The second waveguide core 320 is also below and in physical contact with a first surface of the insulator layer 325. The first waveguide core 310 is in physical contact with a second surface of the insulator layer 325 that is opposed to the first surface. The second waveguide core 320 is embedded within another cladding material 335.

The different components of the WDM 300 are formed from different materials with indices of refraction that obey certain relations. For example, the index of refraction of the first waveguide core 310 is greater than the index of refraction of the third waveguide core 330. The index of refraction of the insulator layer 325 is less than the index of refraction of the first waveguide core 310, and less than the index of refraction of the second waveguide core 320. The index of refraction of the insulator layer 325 may be the same or different than the index of refraction of the third waveguide core 330. The index of refraction of the insulator layer 325 can be the same or different than the index of refraction of the lower cladding 335. In some embodiments, the index of refraction of the third waveguide core 330 is larger than the index of refraction of the lower cladding 335. An index of refraction of the cladding material (not shown in FIG. 3) that surrounds the upper portion of the rib structure 317 and the slab 315 is less than the index of refraction of the third waveguide core 330. The index refraction of the cladding material 335 is less than the index of refraction of the second waveguide core 320. A non-limiting example of possible materials that can be used include: a silicon oxide for the cladding material (not shown in FIG. 3) that surrounds the upper portion of the rib structure 317 and the slab 315, the insulator layer 325 and the cladding material 335; silicon for the second waveguide core 320; and silicon nitride for the first waveguide core 310. Although FIG. 3 is illustrated with different regions having uniform material properties (e.g., the third waveguide core 330, the slab 315, etc.), in some embodiments a region of the WDM 300 may include different layers with different indices of refraction while maintaining the same optical mode behaviors described herein.

While FIGS. 1-3 illustrate WDMs with three waveguide cores, embodiments are so limited. In some embodiments, multiplexing and demultiplexing can be accomplished with two waveguide cores. For example, referring to FIG. 1, some embodiments of the WDM 130 may omit the second waveguide core 121. Similarly, referring to FIG. 2, some embodiments of the WDM 230 may omit the second waveguide core 221. Finally, referring to FIG. 3, some embodiments of the WDM 300 may omit the second waveguide core 320. In embodiments with only two waveguide cores, light of a first wavelength is maintained in a waveguide that guides light of the first wavelength and light of the second wavelength and is not coupled to another waveguide within the WDM; light of a second wavelength is adiabatically coupled to/from another waveguide that guides light of the second wavelength but does not guide light of the second wavelength.

In FIGS. 4A-7D below, reference is made only to two waveguides (the first waveguide core 310 and the third waveguide core 330). It should be understood that the discussion of FIGS. 4A-7D applies to embodiments with two waveguide cores, three waveguides cores, or more than three waveguide cores. In all such embodiments, the third waveguide core 330 guides light of the first wavelength and light of the second wavelength, and the first waveguide core 310 guides light of the first wavelength, but does not guide light of the second wavelength. Further, to physically separate/combine light of two different wavelengths from/into the third waveguide core 330, at least one end of the first waveguide core is displaced relative to an end of the third waveguide core. This is achieved by misaligning the two waveguide cores such that at least a portion of the WDM 300 are not parallel with one another. By forming the two waveguide cores to diverge from one another, the ends of the two waveguide cores can be accessed independently.

Figure 4A:
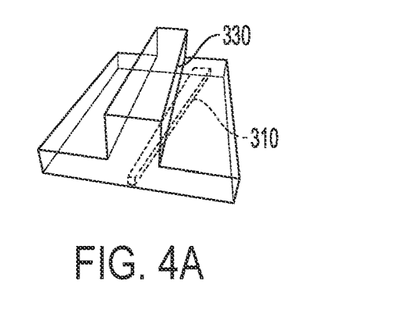
FIGS. 4A-4F are perspective views of respective wavelength division multiplexers, according to non-limiting embodiments of the present application.
Figure 4B:
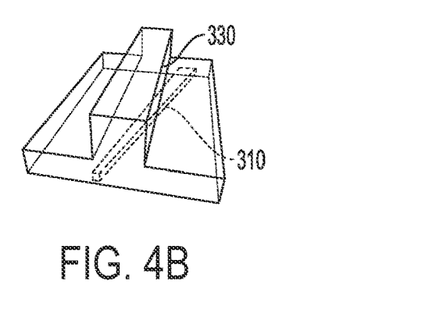
Figure 4C:
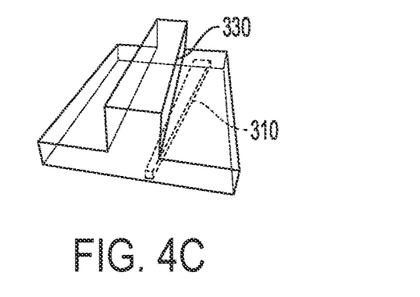
Figure 4D:
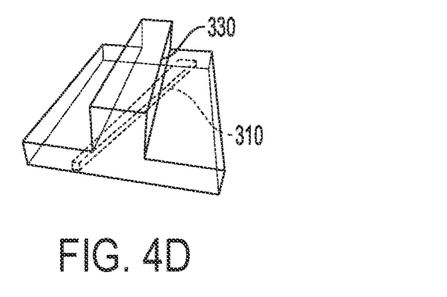
Figure 4E:
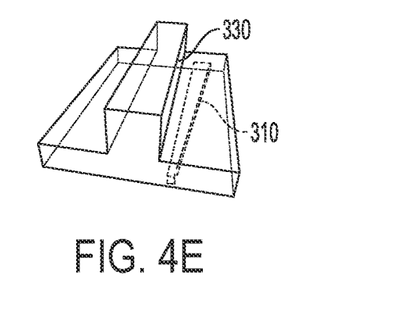

FIGS. 4A-4F illustrate perspective views of different possible arrangements of the first waveguide core 310 relative to the third waveguide core 330. In each of FIGS. 4A-4F, the width of the third waveguide core 330 tapers from a larger width at the near end (corresponding with a facet coupler) to a smaller width at the far end, and the width of the first waveguide core 310 tapers from a smaller width at the near end to a wider width at the far end. In other embodiments, the third waveguide core 330 may not be tapered and may maintain a constant width. In some embodiments, tapering the third waveguide core 330 reduces the size of the WDM 300 needed to complete the adiabatic mode coupling between the first waveguide core 310 and the third waveguide core 330. In each of FIGS. 4A-4F, the propagation axis of the first waveguide core 310 is oriented at a non-zero angle relative to the propagation axis of the third waveguide core 330. The non-zero angle is constant over the length of the WDM 300. In other embodiments, the propagation axis of the first waveguide core 310 may be parallel to the propagation axis of the third waveguide core 330 for a first portion of the WDM 300 and then bend off to the side for a second portion of the WDM 300. In each of FIGS. 4A, 4B, 4C, 4D, and 4F, the propagation axis of the first waveguide core 310 is constant. In other embodiments, the propagation axis of the first waveguide core 310 changes based on the longitudinal position within the WDM 330. For example, the angle of the propagation axis of the first waveguide core 310 relative to the propagation axis of the third waveguide core 330 at the near end of the WDM 300 may be smaller than the angle of the propagation axis of the first waveguide core 310 relative to the propagation axis of the third waveguide core 330 at the far end of the WDM 300. In FIG. 4E, the propagation axis of the first waveguide core 310 is parallel to the third waveguide 300, but in some embodiments the first waveguide core 310 may form a non-zero angle with the third waveguide core 330.

FIG. 4A illustrates an example embodiment of a WDM 300 where the first waveguide core 310 is embedded within the third waveguide core 330 and centered on the center of the third waveguide core 330 at the near end corresponding to the facet coupler of the WDM 300. At the far end of the WDM 300, the first waveguide core 310 is located outside the third waveguide core 330. The first waveguide core 310 is positioned, throughout the WDM 300, at the bottom of the third waveguide core 330.

FIG. 4B illustrates an example embodiment of a WDM 300 where the first waveguide core 310 is embedded within the third waveguide core 330 and positioned at one side of the third waveguide core 330 at the near end corresponding to the facet coupler of the WDM 300. At the far end of the WDM 300, the first waveguide core 310 is located outside the third waveguide core 330 on the other side of the third waveguide core 330 such that the first waveguide core 310 crosses the third waveguide core 330. The first waveguide core 310 is positioned, throughout the WDM 300, at the bottom of the third waveguide core 330.

FIG. 4C illustrates an example embodiment of a WDM 300 where the first waveguide core 310 is embedded within the third waveguide core 330 and positioned at one side of the third waveguide core 330 at the near end corresponding to the facet coupler of the WDM 300. At the far end of the WDM 300, the first waveguide core 310 is located outside the third waveguide core 330 on the same side of the third waveguide core 330. The first waveguide core 310 is positioned, throughout the WDM 300, at the bottom of the third waveguide core 330.

FIG. 4D illustrates an example embodiment of a WDM 300 where the first waveguide core 310 is located outside (i.e., not embedded within) the third waveguide core 330 and positioned to one side of the third waveguide core 330 at the near end corresponding to the facet coupler of the WDM 300. At the far end of the WDM 300, the first waveguide core 310 is located outside the third waveguide core 330 on the opposite side of the third waveguide core 330 such that the first waveguide core 310 crosses the third waveguide core 330. The first waveguide core 310 is positioned, throughout the WDM 300, at the bottom of the third waveguide core 330.

FIG. 4E illustrates an example embodiment of a WDM 300 where the first waveguide core 310 is located outside (i.e., not embedded within) the third waveguide core 330 and positioned to one side of the third waveguide core 330 at the near end corresponding to the facet coupler of the WDM 300. At the far end of the WDM 300, the first waveguide core 310 is located outside the third waveguide core 330 on the same side of the third waveguide core 330 such that the first waveguide core 310 does not cross the third waveguide core 330. No portion of the first waveguide core 310 is embedded within the first waveguide core 330. The first waveguide core 310 is positioned, throughout the WDM 300, at the bottom of the third waveguide core 330.

Figure 4F:
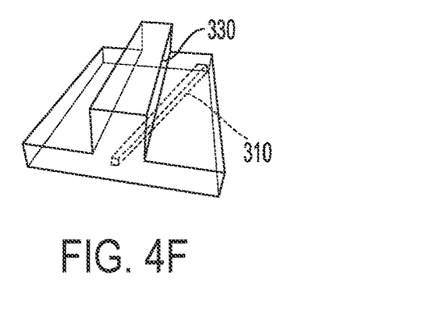

FIG. 4F illustrates an example embodiment of a WDM 300 where the first waveguide core 310 is embedded within the third waveguide core 330 and centered on the center of the third waveguide core 330 at the near end corresponding to the facet coupler of the WDM 300. At the far end of the WDM 300, the first waveguide core 310 is located outside the third waveguide core 330. The first waveguide core 310 is positioned, throughout the WDM 300, nearer to the middle of the third waveguide core 330, at the top surface of the slab 315, rather than the bottom surface of the slab 315. This embodiment is similar to the embodiment illustrated in FIG. 4A, but the first waveguide core 310 is not located at the bottom of the third waveguide core 330, but is raised some distance from the bottom of the third waveguide core 330 such that there is a gap between the first waveguide core 310 and the insulator layer 325 that is located under the third waveguide core 330. Other, non-illustrated embodiments of a WDM 300 may position the first waveguide core 310 at an elevated position relative to the bottom of the third waveguide core 330, as in FIG. 4F, but with waveguide configurations similar to those illustrated in FIGS. 4B-4E.

FIGS. 5A-5E illustrate top views of different possible arrangements of the first waveguide core 310 relative to the third waveguide core 330. In each of FIGS. 5A-5F, the width of the third waveguide core 330 and the width of the first waveguide core 310 are both constant from end to end. In other embodiments, the third waveguide core 330 and the width of the first waveguide core 310 may be tapered such that the width of the first waveguide core 310 changes from end to end. In each of FIGS. 5A-5F, the propagation axis of the first waveguide core 310 is oriented parallel to the propagation axis of the third waveguide core 310 at the near end (corresponding to the facet coupler) and forms at a non-zero angle relative to the propagation axis of the third waveguide core 330 at the opposite end of the WDM 300. The non-zero angle changes over the length of the WDM 300 such that the angle increases. In other embodiments, the propagation axis of the first waveguide core 310 may be a constant angle relative to the third waveguide core 330 over the length of the WDM 300.

Figure 5A:
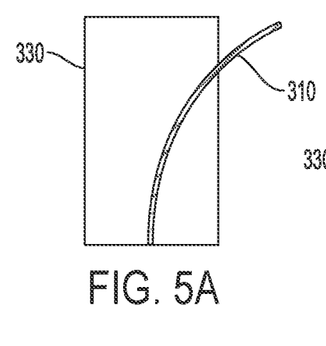
FIGS. 5A-5E are top views of respective wavelength division multiplexers, according to non-limiting embodiments of the present application.

FIG. 5A illustrates an example embodiment of a WDM 300 where the first waveguide core 310 is embedded within the third waveguide core 330 and centered on the center of the third waveguide core 330 at the near end corresponding to the facet coupler of the WDM 300. At the far end of the WDM 300, the first waveguide core 310 is located outside the third waveguide core 330.

Figure 5B:
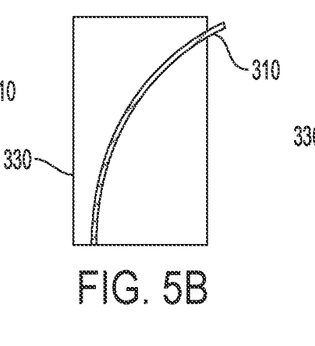

FIG. 5B illustrates an example embodiment of a WDM 300 where the first waveguide core 310 is embedded within the third waveguide core 330 and positioned at one side of the third waveguide core 330 at the near end corresponding to the facet coupler of the WDM 300. At the far end of the WDM 300, the first waveguide core 310 is located outside the third waveguide core 330 on the other side of the third waveguide core 330 such that the first waveguide core 310 crosses the third waveguide core 330.

Figure 5C:
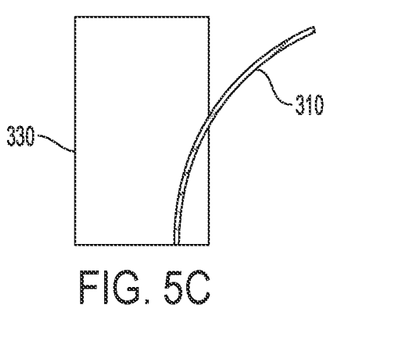

FIG. 5C illustrates an example embodiment of a WDM 300 where the first waveguide core 310 is embedded within the third waveguide core 330 and positioned at one side of the third waveguide core 330 at the near end corresponding to the facet coupler of the WDM 300. At the far end of the WDM 300, the first waveguide core 310 is located outside the third waveguide core 330 on the same side of the third waveguide core 330 such that the first waveguide core 310 does not cross the third waveguide core 330.

Figure 5D:
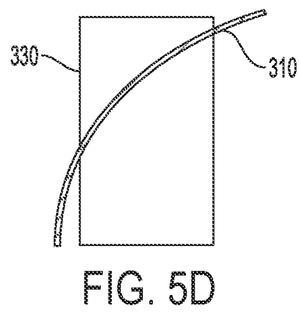

FIG. 5D illustrates an example embodiment of a WDM 300 where the first waveguide core 310 is located outside (i.e., not embedded within) the third waveguide core 330 and positioned to one side of the third waveguide core 330 at the near end corresponding to the facet coupler of the WDM 300. At the far end of the WDM 300, the first waveguide core 310 is located outside the third waveguide core 330 on the opposite side of the third waveguide core 330 such that the first waveguide core 310 crosses the third waveguide core 330.

Figure 5E:
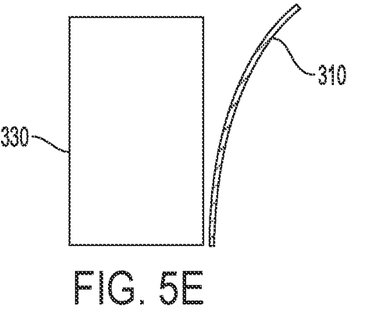

FIG. 5E illustrates an example embodiment of a WDM 300 where the first waveguide core 310 is located outside (i.e., not embedded within) the third waveguide core 330 and positioned to one side of the third waveguide core 330 at the near end corresponding to the facet coupler of the WDM 300. At the far end of the WDM 300, the first waveguide core 310 is located outside the third waveguide core 330 on the same side of the third waveguide core 330 such that the first waveguide core 310 does not cross the third waveguide core 330. No portion of the first waveguide core 310 is embedded within the first waveguide core 330.

FIGS. 6A-6F illustrate end views of different possible arrangements of the first waveguide core 310 relative to the third waveguide core 330. In each of FIGS. 6A-6F, the end view is a view of the end that corresponds with a facet coupler in some embodiments. While it is not illustrated in FIGS. 6A-6F, in each of the illustrated embodiments, the first waveguide core 310 may bend to the right side of the third waveguide core 330 over the length of the WDM 300 such that the end of the first waveguide core 310 at the opposite end of the WDM 300 is to the right of the third waveguide core 330.

Figure 6A:
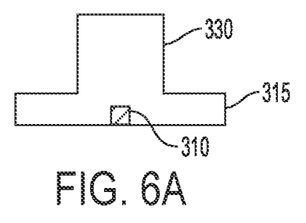
FIGS. 6A-6F are end views of respective wavelength division multiplexers, according to non-limiting embodiments of the present application.

FIG. 6A illustrates an example embodiment of a WDM 300 where the first waveguide core 310 is embedded within the third waveguide core 330 and centered on the center of the third waveguide core 330 at the end corresponding to the facet coupler of the WDM 300. The first waveguide core 310 is positioned, throughout the WDM 300, at the bottom of the third waveguide core 330.

Figure 6B:
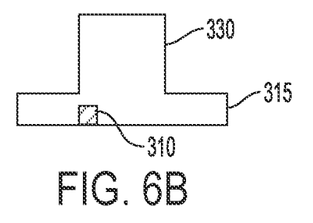

FIG. 6B illustrates an example embodiment of a WDM 300 where the first waveguide core 310 is embedded within the third waveguide core 330 and positioned at one side (e.g., the left side) of the third waveguide core 330 at the near end corresponding to the facet coupler of the WDM 300. The first waveguide core 310 is positioned, throughout the WDM 300, at the bottom of the third waveguide core 330.

Figure 6C:
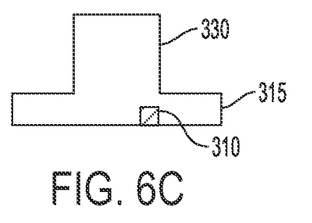

FIG. 6C illustrates an example embodiment of a WDM 300 where the first waveguide core 310 is embedded within the third waveguide core 330 and positioned at one side (e.g., the right side) of the third waveguide core 330 at the near end corresponding to the facet coupler of the WDM 300. The first waveguide core 310 is positioned, throughout the WDM 300, at the bottom of the third waveguide core 330.

Figure 6D:
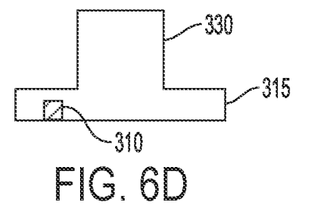

FIG. 6D illustrates an example embodiment of a WDM 300 where the first waveguide core 310 is located outside (i.e., not embedded within) the third waveguide core 330 and positioned to one side (e.g., the left side) of the third waveguide core 330 at the near end corresponding to the facet coupler of the WDM 300. The first waveguide core 310 is positioned, throughout the WDM 300, at the bottom of the third waveguide core 330.

Figure 6E:
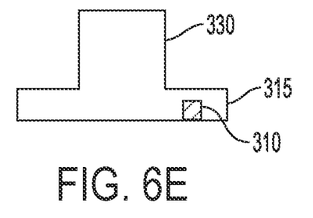

FIG. 6E illustrates an example embodiment of a WDM 300 where the first waveguide core 310 is located outside (i.e., not embedded within) the third waveguide core 330 and positioned to one side (e.g., the right side) of the third waveguide core 330 at the near end corresponding to the facet coupler of the WDM 300. The first waveguide core 310 is positioned, throughout the WDM 300, at the bottom of the third waveguide core 330.

Figure 6F:
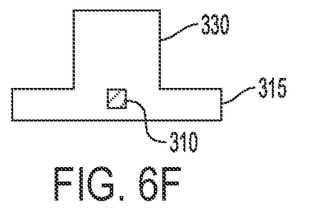

FIG. 6F illustrates an example embodiment of a WDM 300 where the first waveguide core 310 is embedded within the third waveguide core 330 and centered on the center of the third waveguide core 330 at the near end corresponding to the facet coupler of the WDM 300. The first waveguide core 310 is positioned, throughout the WDM 300, nearer to the middle of the third waveguide core 330. The first waveguide core 310 is positioned, throughout the WDM 300, nearer to the middle of the third waveguide core 330, at the top surface of the slab 315, rather than the bottom surface of the slab 315. This embodiment is similar to the embodiment illustrated in FIG. 4A, but the first waveguide core 310 is not located at the bottom of the third waveguide core 330, but is raised some distance from the bottom of the third waveguide core 330 such that there is a gap between the first waveguide core 310 and the insulator layer 325 (not shown) that is located under the third waveguide core 330. Other, non-illustrated embodiments of a WDM 300 may position the first waveguide core 310 at an elevated position relative to the bottom of the third waveguide core 330, as in FIG. 4F, but with waveguide configurations similar to those illustrated in FIGS. 6B-6E.

Figure 7A:
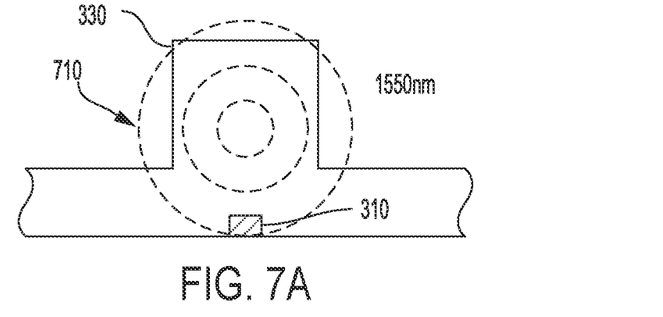
FIG. 7A is a cross-section view of an optical mode of light with a wavelength of 1550 nm in a wavelength division multiplexer, according to a non-limiting embodiment of the present application.
Figure 7B:
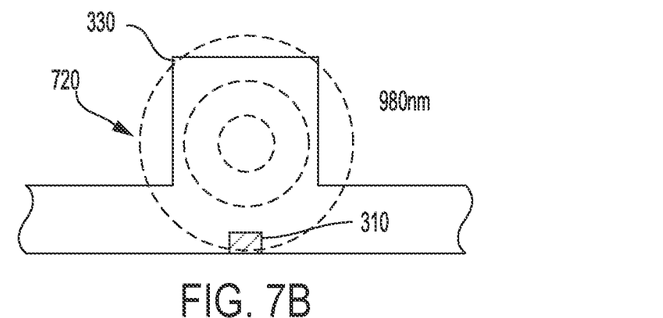
FIG. 7B is a cross-section view of an optical mode of light with a wavelength of 980 nm in a wavelength division multiplexer, according to a non-limiting embodiment of the present application.
Figure 7C:
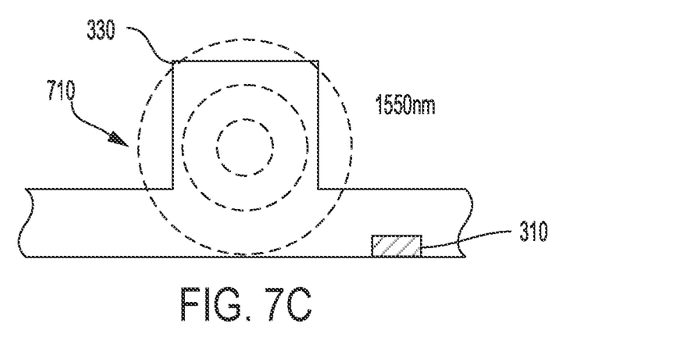
FIG. 7C is a cross-section view of an optical mode of light with a wavelength of 1550 nm in a wavelength division multiplexer, according to a non-limiting embodiment of the present application.
Figure 7D:
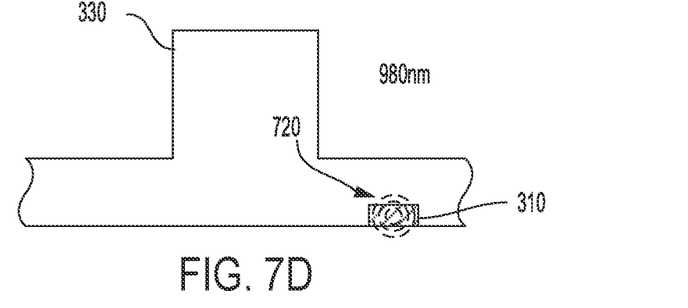
FIG. 7D is a cross-section view of an optical mode of light with a wavelength of 980 nm in a wavelength division multiplexer, according to a non-limiting embodiment of the present application.

FIGS. 7A-7D illustrate the transverse optical mode 710 of light at 1550 nm and the transverse optical mode 720 of light at 980 nm at two different positions with the WDM 300, according to some embodiments. FIGS. 7A-7B illustrate a cross-section of the WDM 300 just after the facet coupler, where the light at 15550 nm and light 980 nm have similar mode size and location. FIGS. 7C-7D illustrate a cross-section of the WDM 300 at the end of the WDM 300 opposite from the facet coupler, where the light at 1550 nm and light 980 nm have different mode size and location. The dashed lines of FIGS. 7A-7D represent contour lines of the optical intensity as a function of transverse position and therefore represent the transverse optical modes 710 and 720. It should be appreciated that the particular wavelengths selected here are non-limiting examples. The WDM 300 may be configured to result in similar transverse optical modes for other wavelengths.

As is shown in FIGS. 7A-7B, both light at 1550 nm and light at 980 nm occupy similar transverse optical modes 710 and 720 near the facet coupler. The transverse optical modes 710 and 720 are centered, for both wavelengths, within the third waveguide core 330. Portions of the transverse optical modes 710 and 720 for both the light at 1550 nm and the light at 980 nm extend outside the third waveguide core 330. Importantly, a portion of the transverse optical mode 720 of the light at 980 nm overlaps with the first waveguide core 310 in the embodiment illustrated in FIGS. 7A-7B and in the other embodiments illustrated in connection with FIGS. 4A-6F. This overlap over the length of the WDM 300 allows the light at 980 nm to adiabatically couple between the first waveguide core 310 and the third waveguide core 330. The light at 1550 nm does not couple with the first waveguide core 310 because the first waveguide core 310 is configured not to support a transverse optical mode 710 at 1550 nm by having a higher mode index than that of the third waveguide core 330.

As is shown in FIGS. 7C-7D, at the end of the WDM 300 where the first waveguide core 310 and the third waveguide core 330 are separated in a transverse direction, the light at 1550 nm maintains approximately the same transverse optical mode 710 that is centered on the third waveguide core 330, and the light at 980 nm occupies a transverse optical mode 720 centered on the first waveguide core 310 and separated in a transverse direction from the third waveguide core 330. As mentioned above, the light at 1550 nm does not couple with the first waveguide core 310 because the first waveguide core 310 is configured not to support a transverse optical mode at 1550 nm. Note that the width of the first waveguide core 310 is larger in FIG. 7C-D than in FIG. 7A-B due to the tapering of the first waveguide core 310.

The transverse optical modes 710 and 720 illustrated in FIGS. 7A-7D are the same whether the WDM 300 is used to multiplex the light at two different wavelengths (e.g., as is done using the transmitting optical system 100 of FIG. 1) or demultiplex the light at two different wavelengths (e.g., as is done using the receiving optical system 200 of FIG. 2).

Figure 8A:
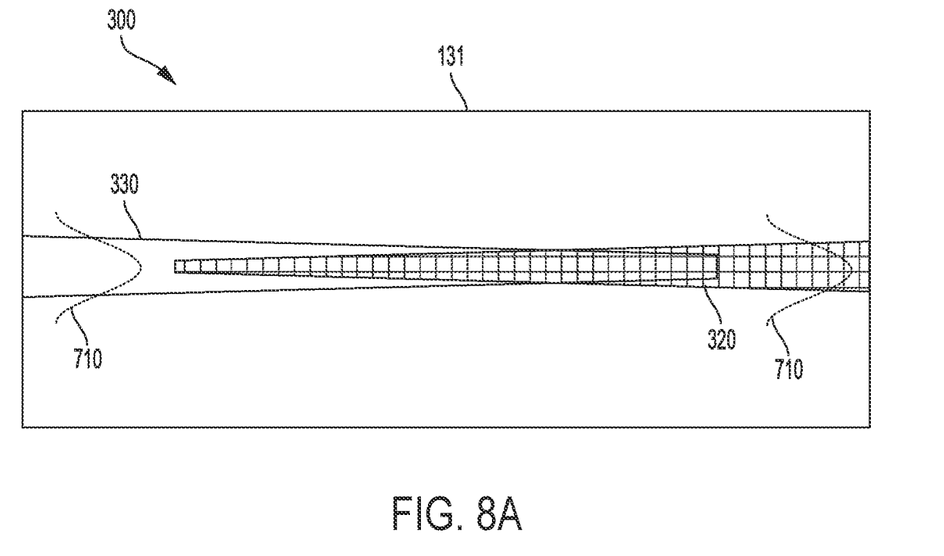
FIG. 8A is a top view of a portion of a wavelength division multiplexer, according to a non-limiting embodiment of the present application

FIG. 8A illustrates a portion of the WDM 300 that, in some embodiments, may be the portion 131 of the transmitting optical system 100 illustrated in FIG. 1. The first waveguide core 310 is not illustrated in FIGS. 8A-B. FIG. 8A shows the waveguide configuration that is configured to adiabatically couple light of the second wavelength (e.g., 1550 nm light) from the third waveguide core 330 to the second waveguide core 320, or vice versa.

As illustrated in FIG. 8A, the third waveguide core 330 tapers from left to right such that the end of the third waveguide core closer to the facet coupler (e.g., the left end) is wider than the end of the third waveguide core farther from the facet coupler. The second waveguide core 320 is not present at the end of the WDM 300 closer to the facet coupler. The second waveguide core 320 starts partially through the portion 131 from left to right. The second waveguide core 320 is tapered such that on the left end it has a first width that is less than the width on the right end of FIG. 8A. The transverse optical mode 710 of the light at the second wavelength (e.g., 1550 nm) is adiabatically coupled between the third waveguide core 330 and the second waveguide core 320.

Figure 8B:
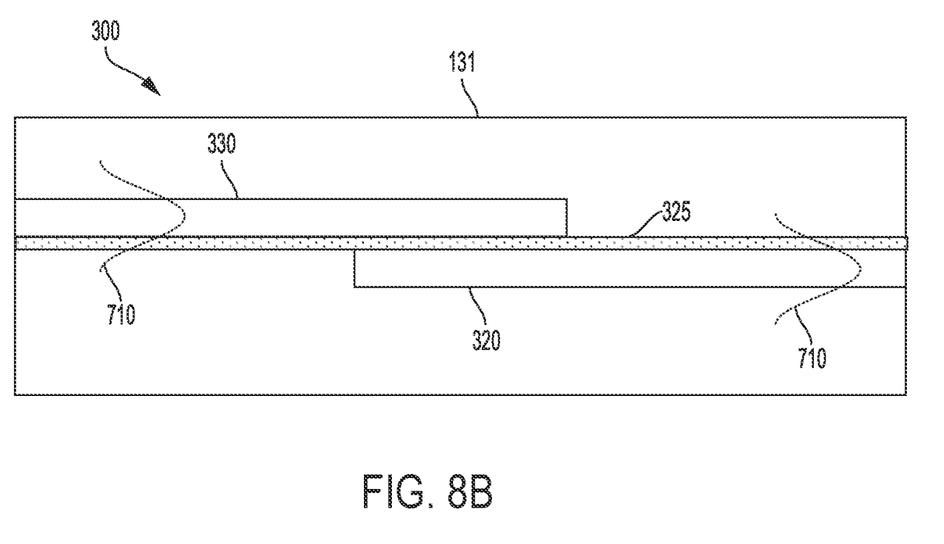
FIG. 8B is a side cross-section view of a portion of a wavelength division multiplexer, according to a non-limiting embodiment of the present application

As illustrated in FIG. 8B, when the transverse optical mode 710 transitions from the third waveguide core 330 to the second waveguide core 320, the transverse optical mode 710 shifts down to be centered on the second waveguide core 320. In FIGS. 8A-8B, the third waveguide core 330 terminates after light is coupled to the second waveguide core 320. In some embodiments, the third waveguide core 330 is formed from the cladding material covering the second waveguide core 320, and may extend indefinitely either with or without patterning.

Figure 9:
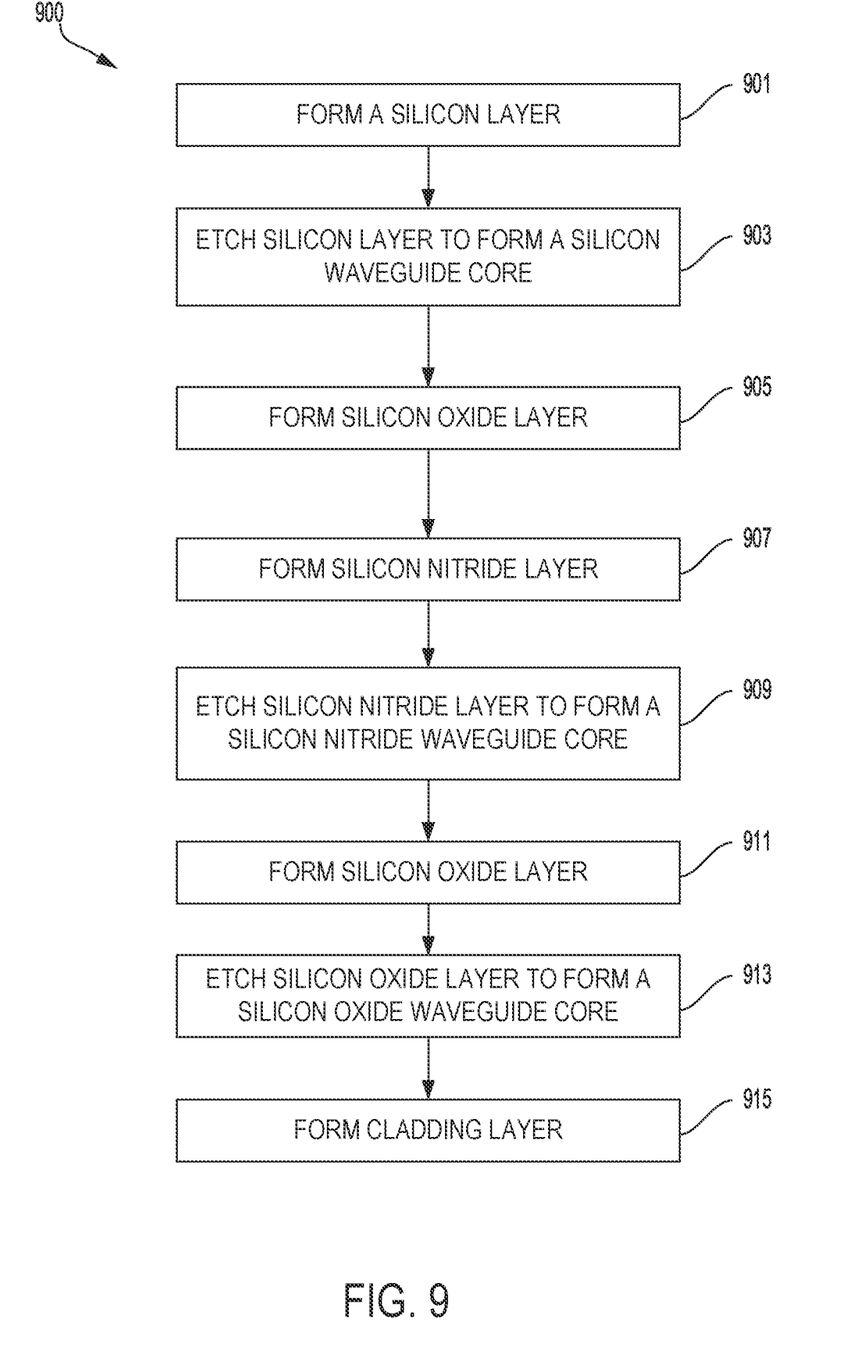
FIG. 9 is a flow chart of a method of fabricating a wavelength division multiplexer, according to a non-limiting embodiment of the present application.

FIG. 9 is a method 900 of fabricating a WDM 300 according to some embodiments. At act 901, the method 900 includes forming a silicon layer. For example, the silicon layer may be formed on a cladding material. At act 903, the method 900 includes etching the silicon layer to form a silicon waveguide core. For example, the silicon waveguide core may have the size, shape, orientation of any of the above discussed embodiments of the second waveguide core 320.

At act 905, the method 900 includes forming a silicon oxide layer. At act 907, the method 900 includes forming a silicon nitride layer on top of the silicon oxide layer. At act 909, the method 900 includes etching the silicon nitride layer to form a silicon nitride waveguide core. For example, the silicon nitride waveguide core may have the size, shape, orientation of any of the above discussed embodiments of the first waveguide core 310.

At act 911, the method 900 includes forming a silicon oxide layer. At act 913, the method 900 includes etching the silicon oxide layer to form a silicon oxide waveguide core. For example, the silicon oxide waveguide core may have the size, shape, orientation of any of the above discussed embodiments of the third waveguide core 330.

At act 915, the method 900 include forming a cladding layer. For example, the cladding layer may be formed over the silicon oxide waveguide core.

While the method 900 of fabricating a WDM 300 is described above using particular materials, it should be understood that other materials may be used to form the various components of the WDM 300.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Use of such ordinal terms in the claims do not necessarily have the same meaning or refer to the same component as components the specification that use the same ordinal terms.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. An integrated wavelength division multiplexer, comprising:
    a first waveguide core extending along a first propagation axis only and configured to guide light of a first wavelength and light of a second wavelength; and
    a second waveguide core extending along a second propagation axis only and configured to guide the light of the second wavelength only, wherein the second propagation axis is oriented at a non-zero angle relative to the first propagation axis, and wherein the second waveguide core is embedded within the first waveguide core at an end of the first waveguide core,
    wherein a cross-section of the first waveguide core continuously shrinks along an entire length of the first propagation axis, wherein a cross-section of the second waveguide core continuously expands along an entire length of the second propagation axis, and wherein the first waveguide core and second waveguide core are configured relative to each other to adiabatically couple the light of the second wavelength between the first waveguide core and the second waveguide core.

2. The integrated wavelength division multiplexer of claim 1, wherein a cross-sectional area of the first waveguide core is larger than a cross-sectional area of the second waveguide core.

3. The integrated wavelength division multiplexer of claim 1, wherein the second waveguide core is positioned at the bottom of the first waveguide core.

4. The integrated wavelength division multiplexer of claim 1, wherein the second waveguide core is horizontally centered within the first waveguide core at the end of the first waveguide core.

5. The integrated wavelength division multiplexer of claim 1, wherein the end is a first end, and wherein the second waveguide core is not embedded within the first waveguide core at a second end of the first waveguide core.

6. The integrated wavelength division multiplexer of claim 1, wherein the first waveguide core and the second waveguide core are positioned on a first level, and wherein the integrated wavelength division multiplexer further comprises a third waveguide core positioned on a second level below the first level.

7. The integrated wavelength division multiplexer of claim 6, further comprising a silicon oxide layer positioned between the first level and the second level.

8. The integrated wavelength division multiplexer of claim 7, wherein at least one of the first waveguide core or the second waveguide core is in physical contact with the silicon oxide layer.

9. The integrated wavelength division multiplexer of claim 1, wherein an index of refraction of the first waveguide core is less than an index refraction of the second waveguide core.

10. The integrated wavelength division multiplexer of claim 1, wherein the first waveguide core comprises silicon oxide and the second waveguide core comprises silicon nitride.

* * * * *